Patented Nov. 16, 1937

2,099,109

UNITED STATES PATENT OFFICE

2,099,109

PROCESS OF OBTAINING PARA-CRESOL FROM TAR ACID MIXTURES

David F. Gould, Riverton, N. J., assignor to The Barrett Company, New York, N. Y., a corporation of New Jersey No Drawing. Application November 5, 1935, Serial No. 48,338

11 Claims. (Cl. 260—154)

This invention relates to a process for obtaining para-cresol of high purity from tar acid mixtures containing para-cresol.

In accordance with the invention of the copending application of Karl Engel, Serial No. 40,277, filed September 12, 1935, para-cresol may be isolated from a mixture of para-cresol and other tar acids by treating the mixture with hydrated oxalic acid or with an aqueous solution of oxalic acid, removing the water, and then cooling to form an oxalic-acid-para-cresol addition compound which may be separated mechanically from other tar acids, e. g., by filtration or centrifuging. The para-cresol addition compound thus formed contains other tar acids, usually meta-cresol, which may be partially removed therefrom by washing with a solvent for the tar acids, such as xylene or petroleum naphtha. Following this procedure and decomposing the para-cresol-oxalic-acid addition compound by treatment with water, the para-cresol finally recovered contains about 85% to 90% of para-cresol.

The crude crystals of para-cresol oxalic acid compound as formed by the process of the Engel application usually contain admixed cresol mother liquor and tar acids other than para-cresol in actual combination with oxalic acid. This contaminating material is not entirely removed by the ordinary washing with xylene or other solvent, although by continued washing with xylene, the purity of the addition compound increases slowly and para-cresol may be obtained therefrom of a purity in the neighborhood of 90%. Such a procedure, however, necessitates the use of a large amount of solvent to obtain satisfactory results.

One object of this invention is to provide a method whereby a technical grade of para-cresol, for example of 85% to 90% purity, may be more easily and economically prepared than has heretofore been possible.

Another object of this invention is to provide a method of producing para-cresol of high purity, i. e., containing 97% to 100% of para-cresol.

In accordance with the present invention, crystalline para-cresol-oxalic-acid addition compound prepared, for example, by the process of the aforementioned Engel application may be slurried with a non-aqueous solvent for tar acids in amount equal to about one to about three times the weight of the addition compound and while maintaining the slurry at a temperature above atmospheric, e. g., above 50° C. and preferably above the complete dissociation point of the addition compound. The mixture may then be cooled to reform crystals of the addition compound, and the resulting crystals separated from the balance of the mixture. Para-cresol may be recovered from these crystals as described below.

Dependent upon the operating conditions, as for example, the temperature, time of treatment, amount of solvent used, and the like, crude, unwashed crystals of para-cresol oxalic addition compounds may be treated to yield either a technical para-cresol of a purity of 85 to 90%, much more economically and with the use of considerably less solvent than has heretofore been the case, or, if desired, by repeatedly applying the process to the same material or by using it on an already partially purified addition compound, a para-cresol of high purity may be obtained, e. g., containing 97 to 100% para-cresol.

I have found that by heating a slurry of solvent and para-cresol-oxalic-acid addition compound at a temperature within the range of 50° to 120° C., and preferably within the range of from 70° C. to about 100° C., the crystals of para-cresol-oxalic-acid addition compound may be decomposed into their components, i. e., liquid para-cresol and solid anhydrous oxalic acid. The para-cresol and accompanying impurities consisting largely of meta-cresol dissolve in the solvent while the anhydrous oxalic acid is only partially dissolved. Partial resolution of the addition compound occurs at about 50° C., and further resolution takes place up to about 65° C., at which temperature substantially complete decomposition of the crystals is effected. On cooling the slurry to a temperature below about 50° C., and preferably to not less than about 15° C., para-cresol addition product may be reformed and separated from the rest of the solution by centrifuging or filtering. The product of this treatment may be subsequently decomposed to yield para-cresol having a purity in excess of 90% para-cresol.

To obtain para-cresol of 97 to 100% purity, partially purified crystals, i. e., crystals yielding para-cresol of 85 to 90% purity may be slurried with the solvent above the decomposition temperature of the addition compound; preferably above about 70°, whereby the addition compound is decomposed and a solution obtained which contains only a small proportion of extraneous tar acids as compared with the para-cresol content thereof. By then cooling the solution to reform the para-cresol-oxalic-acid addition compound and subsequently decomposing the product thus obtained after separating it from the mother liquor, para-cresol of the desired purity may be obtained.

The solvents used in the present invention should be such as to exert no substantial dissociating action on the addition compound at the temperature at which the addition compound is separated and recovered. They should be liquid at this temperature and should be inert to tar acids and to oxalic acid. The use of solvents with boiling points higher than that of para-cresol adds to the difficulty of separating the solvent from the para-cresol in the final distillation steps while solvents having very low boiling points show a greater tendency to loss by evaporation. In the present invention, it is preferred to use xylene or petroleum solvent of like boiling range, but toluene, benzene, carbon tetrachloride, petroleum naphthas, etc. are also applicable.

The following examples of the process of this invention are given, the parts referred to therein being by weight.

*Example 1*.—105 parts of commercial meta-para-cresol containing approximately 58 per cent meta-cresol and 32% para-cresol were treated with 22 parts of hydrated oxalic acid, the mixture dehydrated under a vacuum of 28 inches of mercury and then cooled to 25° C. The crystals of para-cresol-oxalic-acid addition compound were separated from the mother liquor by centrifuging and the crystals thus separated washed with 17 parts of xylene. The para-cresol recovered from a portion of these crystals tested 80 per cent pure. The crystals were then slurried with 2.6 times their weight of xylene the slurry being maintained at 70° C. for about 5 minutes. It was then cooled to 25° C. while being agitated, and the crystals separated by centrifuging. The crystals thus obtained were decomposed with water, the para-cresol layer separated and washed with water to remove oxalic acid, and then distilled. The distillate was found to have a melting point of 32.3° C. corresponding to a content of about 97% para-cresol.

*Example 2*.—30 parts of a meta-cresol-para-cresol mixture containing approximately 61 per cent meta-cresol and 34% para-cresol, were mixed with 6 parts of crystalline oxalic acid hydrate, the mixture dehydrated and crystallized by cooling to 25° C. while being agitated. The resultant slurry was filtered on a suction filter and the crystals of para-cresol-oxalic-acid addition compound washed with 17 parts of xylene. These crystals were then slurried with twice their weight of xylene, heated to a temperature of about 70° C., and then cooled to 25° C. with agitation. The slurry was filtered through a suction filter and the crystals washed with 8 parts of xylene. From the second filtration, crystals of para-cresol-oxalic-acid addition compound were obtained which were decomposed with water and the resulting para-cresol layer was separated, washed with water to remove oxalic acid and fractionated to remove xylene. From the distillation, a relatively pure para-cresol fraction was obtained having a melting point of 33.8° C. corresponding to a content of about 99% para-cresol.

*Example 3*.—2500 parts of crude crystals of addition compound produced by the process of the Engel application (cresol content 60%) were mixed with 2502 parts of xylene at 27° C. and the mixture agitated for about one hour. A sample of the mixture was removed, centrifuged and the crystals tested for the purity of the cresol contained therein, which was found to be 85.0% para-cresol. The mixture of crude crystals and xylene was then heated to 77° C. and afterwards cooled to 25–27° C. About 1914 parts of purified crystals were obtained, the cresol portion of which tested 94.0% para-cresol.

Thus, by the process of this example, the purity of the para-cresol-oxalic-acid addition compound was increased from 85.0% to 94.0% without the use of additional solvent or oxalic acid.

*Example 4*.—1825 parts of washed crystals of para-cresol-oxalic-acid addition compound and having a cresol content which tested 90.3% para-cresol, were mixed with 1836 parts of xylene and agitated for three hours at 20–25° C. A sample was removed at 25° C. and the cresol content of the crystals tested 96.3% para-cresol. The crystals and xylene were heated to 78° C. and the resulting mixture of xylene, cresol and oxalic acid was then cooled to 17° to 20° C. On centrifuging 1493 parts of crystals were obtained, the cresol content of which tested 98.6% para-cresol. By simply mixing and washing with solvent the para-cresol recoverable would contain 3.7% impurities, whereas by decomposing the crystals at an elevated temperature and reforming them on cooling the impurities were reduced to 1.4%.

By the process of this invention para-cresol of high purity may be obtained from crude para-cresol-oxalic acid addition compounds much more efficiently and easily than by any of the processes heretofore proposed, the process requiring no expensive or complicated equipment and being readily controlled.

It will be noted the process of this invention differs from one involving an ordinary recrystallization (in which the material to be purified is dissolved in a suitable solvent and then recrystallized) in that the addition compound to be purified is partially or completely dissociated and subsequently reformed in the presence of a solvent for the tar acids, by first heating and then cooling while agitating the mixture. In this manner the para-cresol-oxalic-acid addition compound may be recovered in a high state of purity by the use of considerably less solvent and less expensive processing steps than is possible when using the ordinary washing or recrystallization procedures.

It is to be understood that this invention is not restricted to the present disclosure otherwise than as defined by the appended claims.

I claim:

1. A process of purifying para-cresol-oxalic-acid addition compound contaminated with tar acids other than para-cresol, which comprises slurrying said impure addition compound with a non-aqueous solvent for said other tar acids at an elevated temperature such that substantial dissociation of the addition compound takes place, cooling the heated mixture and separating purified crystalline para-cresol-oxalic-acid addition compound therefrom.

2. A process of purifying para-cresol-oxalic-acid addition compound contaminated with meta-cresol, which comprises slurrying said impure addition compound with a non-aqueous solvent for said meta-cresol at an elevated temperature such that substantial dissociation of said addition compound into oxalic acid and cresol occurs, cooling the heated mixture to reform purified crystalline para-cresol-oxalic-acid addition compound and separating said purified crystalline addition compound from the mixture.

3. A process of purifying para-cresol-oxalic-acid addition compound contaminated with tar acids other than para-cresol, which comprises slurrying said impure addition compound with xylene heated to a temperature at which substantial decomposition of said crystalline compound into the oxalic acid and cresol constituents thereof occurs, cooling the heated mixture to reform purified crystalline para-cresol-oxalic-acid addition compound and separating said purified crystalline addition compound therefrom.

4. In the purification of para-cresol oxalic acid addition compound, the steps which consist of resolving said compound in the presence of a non-aqueous solvent for tar acids and reforming said compound in crystalline form in the presence of the same solvent.

5. The step in the process of recovering substantially pure para-cresol from a mixture containing para-cresol-oxalic-acid addition compound and meta-cresol, which comprises slurrying said mixture with a non-aqueous solvent for the meta-cresol at a temperature of from 50° C. to 120° C., which solvent is a nonsolvent for at least a substantial amount of said addition compound at a temperature below 50° C.

6. The method for obtaining para-cresol from crude para-meta-cresol mixtures, which comprises forming a para-cresol-oxalic-acid addition compound, slurrying said compound with an organic solvent at a temperature of from about 50° C. to about 120° C., cooling said slurry to reform para-cresol-oxalic-acid addition compound and recovering para-cresol from the para-cresol-oxalic-acid addition compound thus reformed.

7. The method for obtaining para-cresol from crude para-meta-cresol mixtures, which comprises forming a para-cresol-oxalic-acid compound, slurrying said compound with an organic solvent at a temperature of about 70° C. to about 100° C., cooling said slurry to reform para-cresol-oxalic-acid addition compound, and recovering para-cresol from the para-cresol-oxalic-acid addition compound thus reformed.

8. The method for obtaining para-cresol from crude para-meta-cresol mixtures, which comprises forming a para-cresol-oxalic-acid addition compound, slurrying said compound with xylene at a temperature of about 70° C., cooling said slurry to reform para-cresol-oxalic-acid addition compound, and recovering para-cresol from the para-cresol-oxalic-acid addition compound thus reformed.

9. The method for obtaining para-cresol from crude para-meta-cresol mixtures, which comprises forming a para-cresol-oxalic-acid compound, slurrying said compound with xylene at a temperature of from about 50° C. to about 120° C., cooling said slurry to reform the para-cresol-oxalic-acid addition compound, and recovering para-cresol from the para-cresol-oxalic-acid addition compound thus reformed.

10. The method for obtaining para-cresol from crude para-meta-cresol mixtures, which comprises forming a para-cresol-oxalic-acid compound, slurrying said compound with from one to three parts by weight of xylene, at a temperature of from about 50° C. to about 120° C., cooling said slurry to not less than about 15° C. to reform the para-cresol-oxalic-acid addition compound, and recovering para-cresol from the para-cresol-oxalic-acid addition compound thus reformed.

11. The method for obtaining para-cresol from crude para-meta-cresol mixtures, which comprises forming a para-cresol-oxalic-acid addition compound with said para-cresol, washing said compound with xylene, slurrying said compound with about twice its weight of xylene at a temperature of about 70° C., cooling said slurry to not less than 15° C. to reform the para-cresol-oxalic-acid addition compound while agitating it, and recovering para-cresol from the para-cresol-oxalic-acid addition compound thus reformed.

DAVID F. GOULD.